United States Patent [19]

Kokubo et al.

[11] 4,329,440

[45] May 11, 1982

[54] PROCESS FOR PRODUCING HIGHLY CRYSTALLINE α-OLEFINIC POLYMER

[75] Inventors: Toshiyuki Kokubo; Takashi Yamao, both of Ichihara, Japan

[73] Assignee: Sumitomo Chemical Company, Limited, Osaka, Japan

[21] Appl. No.: 68,481

[22] Filed: Aug. 21, 1979

Related U.S. Application Data

[63] Continuation of Ser. No. 670,069, Mar. 24, 1976, abandoned, which is a continuation-in-part of Ser. No. 539,602, Jan. 8, 1975, abandoned.

[30] Foreign Application Priority Data

Jan. 10, 1974 [JP] Japan ................................ 49-6372
Nov. 11, 1974 [JP] Japan ............................ 49-130355

[51] Int. Cl.$^3$ .......................... C08F 4/64; C08F 10/06
[52] U.S. Cl. .............................. 526/142; 252/429 B; 525/247; 526/351
[58] Field of Search ...................... 526/142; 525/247

[56] References Cited

U.S. PATENT DOCUMENTS

| | | | |
|---|---|---|---|
| 3,149,097 | 9/1964 | Coover | 526/142 |
| 3,178,401 | 4/1965 | Coover | 526/142 |
| 3,230,208 | 1/1966 | Coover | 526/142 |

FOREIGN PATENT DOCUMENTS

| | | |
|---|---|---|
| 2225690 | 12/1972 | Fed. Rep. of Germany . |
| 1128090 | 9/1968 | United Kingdom . |
| 1281932 | 7/1972 | United Kingdom . |
| 1304556 | 1/1973 | United Kingdom . |

*Primary Examiner*—Edward J. Smith
*Attorney, Agent, or Firm*—Birch, Stewart, Kolasch & Birch

[57] ABSTRACT

A process for producing a highly crystalline α-olefinic polymer in a high yield, which comprises contacting propylene or a mixture of propylene and another α-olefin with a mixed catalyst system produced by adding a lactone as the third component to a catalyst system consisting essentially of titanium trichloride (1) and a dialkylaluminum halide (2), by which the by-production of the undesired atactic polymer can be decreased.

3 Claims, No Drawings

PROCESS FOR PRODUCING HIGHLY CRYSTALLINE α-OLEFINIC POLYMER

This application is a continuation of copending application Ser. No. 670,069, filed on Mar. 24, 1976, which in turn is a continuation-in-part of Ser. No. 539,602, filed on Jan. 8, 1975, both now abandoned.

The present invention relates to a process for producing a highly crystalline α-olefinic polymer using a novel mixed catalyst system. More particularly, it relates to a process for producing a highly crystalline α-olefinic polymer comprising contacting propylene or a mixture of propylene and another α-olefin with a mixed catalyst system produced by adding a lactone as the third component to a catalyst system consisting essentially of titanium trichloride and a dialkylaluminum halide.

In the present specification and claims, the term "polymerization" means both homopolymerization and copolymerization, and the term "polymer" means both homopolymer and copolymer, unless specified otherwise.

It is well known that a highly crystalline α-olefinic polymer can usually be produced by contacting an α-olefin with a so-called "stereoregular catalyst" consisting essentially of an organic aluminum compound and titanium trichloride or the eutectic mixture thereof with aluminum chloride. However, it is also known that when propylene is polymerized in the presence of a catalyst system consisting of titanium trichloride and triethylaluminum, a heptane-insoluble polymer, i.e. the crystalline polymer, is produced only in the yield of 70 to 80%, and further that when a catalyst system consisting of titanium trichloride and diethylaluminum chloride is used, the yield of the heptane-insoluble polymer is 85 to 95%. Thus, even by using these catalyst systems, which are considered to be the comparatively favorable one for inhibiting the by-production of the heptane-soluble polymer among the conventional Ziegler-Natta catalysts, the heptane-soluble polymer, i.e. an atactic polymer, is still produced in the ratio of 5 to 30% on the basis of the whole polymer.

Furthermore, it is also known that when a copolymer is produced from two or more kinds of monomers, for instance, when propylene is copolymerized with ethylene, the by-production of the non-crystalline, heptane-soluble polymer is largely increased with the increase of the ethylene content and thereby the yield of the desired crystalline polymer is significantly decreased. For instance, when an ethylene-propylene copolymer having an ethylene content of 10% by weight is produced by using a catalyst system consisting of titanium trichloride and triethylaluminum, the yield of the heptane-insoluble polymer is merely 40 to 60%, and in case of using a catalyst system consisting of titanium trichloride and diethylaluminum chloride, the yield of the heptane-insoluble polymer is 50 to 80%.

The ethylene-propylene copolymer shows improved impact strength, low-temperature brittleness resistance and transparency in comparison with propylene homopolymer. However, the heptane-soluble polymer, i.e. the atactic polymer, is usually non-crystalline and is a useless by-product. The by-production of the useless non-crystalline polymer is undesirable for the production of the crystalline polymer, because the by-production thereof results in the superfluous consumption of the starting monomers and further in the complicated steps and increased number and volume of the apparatus for removing the non-crystalline polymer from the crystalline polymer. Moreover, if the heptane-soluble polymer is produced in the ratio of 50% by weight or more on the basis of the whole polymer, the conventional processes can not be practically carried out owing to various defects, such as the impossibility of the heat removal, the clogging of the pipes of the lowering of the production capacity because of the increased viscosity of the polymer slurry.

Accordingly, from the practical viewpoint, it is desirable to find a catalyst system which can give the desired crystalline polymer with a lesser by-production of the non-crystalline polymer. Besides, even if the by-production of the non-crystalline polymer is decreased, if the catalyst system affects the molecular weight of the polymer or decreases the polymerization rate or the bulk density of the crystalline polymer, it can not be used for the industrial production of the crystalline polymer.

Under the circumstances, various methods for producing a catalyst useful for the production of α-olefinic polymers having a higher stereo-regularity have been proposed for eliminating these defects, for instance, by pulverizing the titanium trichloride with a ball mill, or the like (Japanese Patent Publication No. 3,367/1966); by pulverizing the titanium trichloride together with an organic material such as an α,β-unsaturated carboxylic acid ester (Japanese Patent Publication No. 18,848/1972); or by pulverizing the titanium trichloride together with an unsubstituted or lower alkyl-substituted benzoic acid ester (Japanese Patent Publication No. 25,706/1972). It has been also proposed to use a lactone as the modifier for titanium trichloride in these methods (British Pat. No. 1,304,556, Japanese Patent Publication No. 48,634/1974 and Japanese Patent Laid Open Publication No. 3,188/1975). However, in such a method, it is not clear why the lactone is useful as the modifier, and moreover, the method requires a longer time for the co-pulverization and the extra washing.

For producing the α-olefinic polymers having a higher stereo-regularity, is is also proposed to add the third component to the above two components, for instance, using a carboxylic acid ester as the third component (Japanese Patent Publication No. 37,783/1970), and using an α,β-ethylenically unsaturated compound

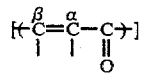

as the third component (British Pat. No. 1,128,090). Moreover, as the method using a lactone as the third component, there are known some methods wherein the organic aluminum component is a trialkylaluminum (U.S. Pat. No. 3,149,097), an aluminum sesquihalide (U.S. Pat. No. 3,178,401) or an aluminum dihalide (U.S. Pat. No. 3,230,208). However, according to the present inventors' experimental test results, these methods are not necessarily suitable for the industrial production of the highly crystalline α-olefinic polymer, because the by-production of the heptane-soluble polymer can not be satisfactorily decreased or the polymerization rate is extremely low.

The present inventors have intensively studied to find an improved process for producing a highly crystalline α-olefinic polymer in a high yield without the defects, such as the remarkable decrease of the polymerization rate, the remarkable influence on the molecular weight of the polymer and the lowering of the bulk density of the polymer. As the result, it has been found that this objective can be achieved by using a mixed catalyst system producing by adding a lactone as the third component to a catalyst system consisting essentially of titanium trichloride and a dialkylaluminum halide.

An object of the present invention is to provide an improved process for producing a highly crystalline α-olefinic polymer in a high yield while decreasing the by-production of the undesired atactic polymer.

Another object of the invention is to provide a novel mixed catalyst system useful for the highly crystalline α-olefinic polymer in a high yield while decreasing the by-production of the undesired atactic polymer.

These and other objects will be apparent from the description hereinafter.

According to the present invention, the desired highly crystalline α-olefinic polymer can be produced by contacting propylene or a mixture of propylene and another α-olefin with a mixed catalyst system consisting essentially of three components: (1) titanium trichloride, (2) a dialkylaluminum halide of the formula: $AlR_2X$ wherein R is a hydrocarbon group and X is a halogen, and (3) a lactone having a 4- to 10-membered ring wherein the side chain may contain one or more substituents, which is produced by adding the third component: lactone to the catalyst system of two components of (1) titanium trichloride and (2) dialkylaluminum halide.

As the monomer for the polymerization, there may be used propylene alone, or a mixture of propylene and another α-olefin. The other α-olefin includes ethylene, butene-1, 3-methylbutene-1, 4-methylpentene-1, or a mixture of two or more thereof. Particularly suitable other α-olefin is ethylene. The polymerization of the present invention may be carried out in the presence of hydrogen as molecular regulator.

The first component of the catalyst used in the present invention includes any conventional titanium trichloride, such as the one obtained by reducing titanium tetrachloride with aluminum, hydrogen or an organic aluminum compound (e.g. diethylaluminum chloride), or the one obtained by treating the various titanium trichlorides as mentioned above with an organic material (e.g. methyl methacrylate, butyl formate or pyridine).

The second compound of the catalyst is a dialkylaluminum halide having the general formula: $AlR_2X$ wherein R is a hydrocarbon group and X is a halogen. The hydrocarbon group (R) includes an alkyl group having 1 to 12 carbon atoms (e.g. methyl, ethyl, propyl, isopropyl, butyl, isobutyl, pentyl, hexyl, octyl, decyl, undecyl or dodecyl), an aryl group (e.g. phenyl), an aralkyl group having 1 to 2 carbon atoms in the alkyl moiety (e.g. benzyl or phenethyl), a mono-, di- or trialkylaryl group having 1 to 3 carbon atoms in the alkyl moiety (e.g. tolyl or xylyl), and a cycloalkyl group having 5 to 7 carbon atoms (e.g. cyclopentyl or cyclohexyl). Suitable examples of the dialkylaluminum halide are diethylaluminum chloride, di- ethylaluminum bromide, dipropylaluminum chloride, dipropylaluminum bromide, or a mixture of two or more thereof.

The third component of the catalyst is a lactone having the following formula:

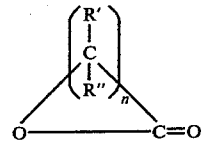

wherein R' and R" are each hydrogen, a saturated or unsaturated aliphatic hydrocarbon group having 1 to 20 carbon atoms (e.g. methyl, ethyl, propyl, butyl, lauryl, palmityl or stearyl), an alicyclic hydrocarbon group (e.g. cyclopentyl or cyclohexyl), or an aromatic hydrocarbon group (e.g. phenyl); and n is an integer of 2-8. The most effective lactones are γ-butyrolactone, γ-valerolactone, γ-caprolactone, ε-caprolactone or the like.

Representative examples of the lactones are as follows: (1) γ-Lactones of the formula:

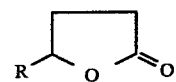

wherein R is a saturated or unsaturated aliphatic hydrocarbon group having 1 to 20 carbon atoms, an alicyclic hydrocarbon group and an aromatic hydrocarbon group, e.g. γ-butyrolactone (R=H), γ-valerolactone (R=CH_3), γ-caprolactone (R=C_2H_5), γ-caprylolactone (R=n-C_4H_9), γ-laurolactone (R=n-C_8H_{17}), γ-palmitolactone (R=n-C_{12}H_{25}) or γ-stearolactone (R=n-C_{14}H_{29});

(2) δ-Lactones of the formula:

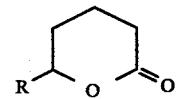

wherein R is as defined above, e.g. δ-valerolactone (R=H) or δ-caprolactone (R=CH_3);

(3) ε-Lactones, e.g. ε-caprolactone of the formula:

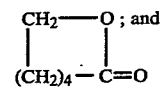

(4) β-Lactones of the formula:

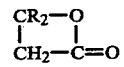

wherein R is as defined above, e.g. β-propiolactone (R=H) or dimethylpropiolactone (R=CH_3).

The catalyst components,: titanium trichloride the di-alkylaluminum halide and the lactone are usually used in the molar ratio of 1:0.1-30: 0.001-10, preferably 1:2-10:0.01-1 (titanium trichloride: dialkylaluminum halide: lactone), but these proportions may be variable depending on the kinds and proportion of the monomers, the polymerization temperature, the kinds of the catalyst and the polymerization solvent, and other polymerization conditions.

The mixed catalyst system used in the present invention is obtained by firstly preparing a two components catalyst system consisting essentially of titanium trichloride and a dialkylaluminum halide and thereafter adding thereto the lactone as the third component. However, when the catalyst is formed in a suitable manner, it is more effective. For instance, when the catalyst is used in the following manner, the desired polymerization reaction is more preferably carried out.

(i) The two components catalyst system consisting essentially of titanium trichloride and a dialkylaluminum halide is prepared, and thereto are added a lactone together with propylene or a mixture of propylene and another $\alpha$-olefin to form a mixed catalyst system, and thereto is further added propylene or a mixture of propylene and another $\alpha$-olefin, and the mixture is subjected to the copolymerization reaction.

(ii) In the presence the of two components catalyst system consisting essentially of titanium trichloride and a dialkylaluminum halide, propylene or a mixture of propylene and another $\alpha$-olefin, preferably propylene alone, is polymerized in the fixed amount (i.e. until 3,000 g or less of the polymer per 1 g of titanium trichloride is produced), and then a lactone is added to the system to form the mixed catalyst, and thereto is further added propylene or a mixture of propylene and another $\alpha$-olefin, preferably propylene alone, and the mixture is further subjected to the polymerization reaction. When a lactone is added after the mixture is polymerized to an extent of more than 3,000 g/titanium trichloride (g), the desired catalyst effect can hardly be exhibited.

The polymerization reaction of the present invention may be carried out in the absence of a solvent, i.e. by using a liquified or gaseous monomer, but is usually carried out in an inert hydrocarbon solvent. Suitable examples of the inert hydrocarbon solvent are a straight or branched aliphatic hydrocarbon (e.g. propane, butane, pentane, hexane, heptane or octane), an alicyclic hydrocarbon (e.g. methylcyclopentane, cyclohexane or tetralin), an aromatic hydrocarbon (e.g. benzene, toluene or xylene), or the like, which may be used alone or in a mixture thereof.

The polymerization conditions may be varied within a wide range. For instance, the polymerization pressure may usually be an optional one of not lower than atmospheric pressure, and preferably from atmospheric pressure to 100 kg/cm$^2$. The polymerization temperature may usually be from 0° to 200° C., preferably from 50° to 90° C. The polymerization time may usually be from 10 minutes to 50 hours, preferably 20 minutes to 30 hours. Moreover, the polymerization reaction may be carried out either in a batch system or in a continuous system.

After a prescribed amount of the monomers is polymerized for a prescribed time, the catalyst action may be stopped in any conventional manner which is usually used in the polymerization of $\alpha$-olefins. For instance, a small amount of alcohols is added to the polymerization system in an atmosphere of an inert gas to deactivate the catalyst, and then the reaction mixture is washed with a large amount of alcohol, hydrochloric acid-alcohol or acetylacetone to remove the catalyst residue which is contained in the reaction system as an ash, and thereby the desired white polymer having less ash is obtained.

The polymer thus obtained is a highly stereoregular polymer having a high molecular weight and can readily give various molded products, films, or the like.

Thus, according to the present invention, propylene is polymerized or copolymerized with other olefins in the presence of a mixed catalyst to give a highly crystalline, isotactic polymer which is insoluble in the polymerization solvent in a high yield wherein the by-production of the undesired atactic polymer which is soluble in the polymerization solvent is decreased.

The present invention is illustrated by the following Examples but is not limited thereto.

EXAMPLE 1

A 1.0 liter glass-made pressure autoclave provided with a stirrer is sufficiently dried and the air in the system is replaced by argon gas and then the pressure is returned to atmospheric pressure. The reactor is charged with n-heptane (600 ml), diethylaluminum chloride (0.96 g) and titanium trichloride (AA grade, 0.303 g) under argon gas. Hydrogen gas is added thereto until the pressure increases 0.3 kg/cm$^2$ over the atmospheric pressure, and the temperature is raised to 60° C. While keeping the temperature of 60° C. and the pressure at 6 kg/cm$^2$, propylene (120 g) is added to the mixture over a period of 68 minutes. To the mixture is added a solution of $\gamma$-caprolactone (0.116 g) in toluene-heptane (1:1 by volume, 10 ml) at an ethylene pressure of 8 kg/cm$^2$. While keeping the temperature at 60° C. and the pressure at 8 kg/cm$^2$, ethylene (20 g) is added thereto over a period of 21 minutes. To the reaction mixture is added n-butanol (10 ml) under a propylene pressure of 8.5 kg/cm$^2$ to stop the polymerization reaction. The heptane-insoluble copolymer is separated from the heptane-soluble copolymer by decantation, washed with an excess amount of heptane, washed with hydrochloric acid-methanol for 10 minutes and then dried under a reduced pressure to give a white copolymer (69.6 g).

The heptane supernatant liquid and the washing liquid obtained above are combined and then added to an extremely excess amount of methanol and then the precipitated copolymer is separated and dried under a reduced pressure to give heptane-soluble copolymer (10.1 g).

EXAMPLE 2

The Example 1 is repeated except that $\gamma$-butyrolactone (0.0803 g) is used instead of $\gamma$-caprolactone to give heptane-insoluble copolymer (67.3 g) heptane-soluble copolymer (10.5 g).

EXAMPLE 3

The Example 1 is repeated except that $\beta$-propiolactone (0.076 g) is used instead of $\gamma$-caprolactone to give heptane-insoluble copolymer (66.0 g) and heptane-soluble copolymer (15.5 g).

COMPARATIVE EXAMPLE 1

The Example 1 is repeated except that $\gamma$-caprolactone is not used to give heptane-insoluble copolymer (61.2 g) and heptane-soluble copolymer (16.2 g). In this procedure, propylene (120 g) is added over a period of 68 minutes and ethylene (20 g) is added over a period of 20 minutes.

As is made clear from the above results, the by-production of heptane-soluble is decreased in Example 1 by adding $\gamma$-caprolactone without lowering the polymerization rate.

EXAMPLE 4

The Example 1 is repeated except that propylene (65 g) is added to the system containing diethylaluminum chloride and titanium trichloride at a temperature of 60° C. and under a pressure of 6 kg/cm$^2$, and thereto is immediately added a solution of γ-butyrolactone (0.0805 g) in toluene-hexane (1:1 by volume, 10 ml) under an ethylene pressure of 8 kg/cm$^2$, and further ethylene (20 g) is added thereto while keeping the temperature at 60° C. and the pressure at 8 kg/cm$^2$, and thereto is immediately added propylene (55 g) while keeping the temperature at 60° C. and the pressure at 8 kg/cm$^2$ to give heptane-insoluble copolymer (45.1 g) and heptane-soluble copolymer (31.9 g).

COMPARATIVE EXAMPLE 2

The Example 4 is repeated except that γ-butyrolactone is not used to give heptane-insoluble copolymer (38.9 g) and heptane-soluble copolymer (38.5 g).

The results of the above Examples 1–4 and Comparative Examples 1–2 are summarized in the following Table 1.

TABLE 1

| Conditions and results | Example 1 | Example 2 | Example 3 | Comp. Ex. 1 | Example 4 | Comp. Ex. 2 |
|---|---|---|---|---|---|---|
| Polymerization conditions: | | | | | | |
| Titanium trichloride (AA grade, g) | 0.303 | 0.308 | 0.306 | 0.304 | 0.304 | 0.300 |
| Molar ratio of diethylaluminum chloride: titanium trichloride (AA grade) | 5.3 | 5.1 | 5.2 | 5.2 | 5.2 | 5.2 |
| Molar ratio of lactone: titanium trichloride (AA grade) | 0.67 | 0.60 | 0.68 | — | 0.55 | — |
| Temperature (°C.) | 60 | 60 | 60 | 60 | 60 | 60 |
| Pressure (kg/cm$^2$) | 6–8 | 6–8 | 6–8 | 6–8 | 6–8 | 6–8 |
| Hydrogen partial pressure (kg/cm$^2$) | 0.3 | 0.3 | 0.3 | 0.3 | 0.3 | 0.3 |
| Heptane-insoluble copolymer: | | | | | | |
| Yield (g) | 69.6 | 67.3 | 66.0 | 61.2 | 45.1 | 38.9 |
| Bulk density (g/cm$^3$) | 0.357 | 0.313 | 0.317 | 0.291 | 0.210 | 0.182 |
| Ethylene content (% by weight) | 11.6 | 11.7 | 11.5 | 12.0 | 12.7 | 13.3 |
| Insoluble copolymer production rate (% by weight) | 87.3 | 86.5 | 81.0 | 79.1 | 58.6 | 50.3 |

EXAMPLE 5

A 1.5 liter glass-made pressure autoclave provided with a stirrer is sufficiently dried and the air in the system is replaced by argon gas and then the pressure is returned to atmospheric pressure. The reactor is charged with n-heptane (600 ml), diethylaluminum chloride (0.96 g) and titanium trichloride (AA grade, 0.299 g) under an atmosphere of argon gas. Hydrogen gas is added thereto until the pressure increases 0.3 kg/cm$^2$ over the atmospheric pressure, and the temperature is raised to 75° C. While keeping the temperature at 75° C., a solution of ε-caprolactone (0.0346 g) in toluene-heptane (1:1 by volume, 10 ml) is added to the mixture under a propylene pressure of 5 kg/cm$^2$, and then while keeping the pressure at 5 kg/cm$^2$ propylene (120 g) is added over a period of 95 minutes. To the reaction mixture is added n-butanol (5 ml) under a nitrogen pressure of 8 kg/cm$^2$ to stop the polymerization reaction. The heptane-insoluble polymer is separated from the heptane supernatant liquid by decantation, washed with an excess amount of heptane, washed with hydrochloric acid-methanol for 10 minutes and then dried under a reduced pressure to give a white polymer (76.2 g).

The heptane supernatant liquid and the washing liquid obtained above are combined and added to an extremely excess amount of methanol, and then the precipitated polymer is separated and dried under a reduced pressure to give heptane-soluble polymer (5.6 g).

EXAMPLE 6

The Example 5 is repeated except that a solution of γ-caprolactone (0.0108 g) in heptane (30 ml) is used instead of the solution of ε-caprolactone to give heptane-insoluble polymer (74.1 g) and heptane-soluble polymer (7.7 g).

EXAMPLE 7

The Example 5 is repeated except that the reactor is charged with n-heptane (600 ml), diethylaluminum chloride (0.96 g) and titanium trichloride (0.300 g) and further γ-butyrolactone (0.0346 g) is used instead of ε-caprolactone to give heptane-insoluble polymer (73.5 g) and heptane-soluble polymer (7.8 g).

COMPARATIVE EXAMPLE 3

The Example 5 is repeated except that ε-caprolactone is not used to give heptane-insoluble polymer (73.8 g) and heptane-soluble polymer (9.0 g). In this procedure, propylene (120 g) is added over a period of 83 minutes.

As is made clear from the above results, the by-production of heptane-soluble polymer is decrease in Example 5 by adding ε-caprolactone without lowering the polymerization rate.

EXAMPLE 8

The same reactor as in Example 5 is charged with n-heptane (600 ml), diethylaluminum chloride (0.96 g) and titanium trichloride (AA grade, 0.301 g) under an atmosphere of argon gas. Hydrogen gas is added thereto until the pressure increases 0.3 kg/cm$^2$ over the atmospheric pressure, and the temperature is raised to 75° C. While keeping the temperature at 75° C. and the pressure at 3 kg/cm$^2$, propylene (50 g) is added over a period of 68 minutes. To the mixture is immediately added a solution of γ-butyrolactone (0.0121 g) in toluene-hexane (1:1 by volume, 10 ml) under a propylene pressure of 5 kg/cm$^2$, and then while keeping the temperature at 75° C. and the pressure at 5 kg/cm² propylene (70 g) is added over a period of 84 minutes. To the mixture is immediately added n-butanol (5 ml) under a nitrogen pressure of 8 kg/cm² to stop the polymerization reaction. The heptane-insoluble polymer is separated from the heptane supernatant liquid by decantation, washed with an excess amount of heptane, washed with hydrochloric acid-methanol for 10 minutes and then dried under a reduced pressure to give a white polymer (71.8 g).

The heptane supernatant liquid and the washing liquid obtained above are combined and added to an extremely excess amount of methanol, and then the precipitated polymer is separated and dried under a reduced pressure to give heptane-soluble polymer (8.8 g).

COMPARATIVE EXAMPLE 4

The Example 8 is repeated except that γ-butyrolactone is not used to give heptane-insoluble polymer (70.1 g) and heptane-soluble polymer (10.5 g).

EXAMPLE 9

The same reactor as in Example 5 is charged with n-heptane (600 ml), diethylaluminum chloride (0.96 g) and titanium trichloride (AA grade, 0.307 g) under an atmosphere of argon gas. Hydrogen gas is added thereto until the pressure increases 0.3 kg/cm² over the atmospheric pressure, and the temperature is raised. γ-Butyrolactone (0.0635 g) is added thereto under a propylene pressure of 6 kg/cm², and then while keeping the temperature at 60° C. and the pressure at 6 kg/cm² propylene (125 g) is added over a period of 105 minutes, and subsequently while keeping the temperature at 60° C. and the pressure at 8 kg/cm² ethylene (25 g) is added over a period of 39 minutes. To the mixture is immediately added n-butanol (5 ml) under a nitrogen pressure of 8 kg/cm² to stop the polymerization reaction. The heptane-insoluble polymer is separated from the heptane supernatant liquid by decantation, washed with an excess amount of heptane, washed with hydrochloric acid-methanol for 10 minutes and then dried under a reduced pressure to give a white polymer (71.5 g).

The heptane supernatant liquid and the washing liquid obtained above are combined and added to an extremely excess amount of methanol, and then the precipitated polymer is separated and dried under a reduced pressure to give heptane-soluble polymer (17.9 g).

COMPARATIVE EXAMPLE 5

The Example 9 is repeated except that γ-butyrolactone is not used to give heptane-insoluble polymer (73.0 g) and heptane-soluble polymer (20.0 g).

EXAMPLE 10

The Example 5 is repeated except that a solution of γ-butyrolactone (0.0227 g) in toluene-heptane (1:1 by volume, 10 ml) is used instead of the solution of ε-caprolactone and further butene-1 (4 g) is added after the addition of propylene (120 g) to give heptane-insoluble polymer (72.2 g) and heptane-soluble polymer (13.5 g).

COMPARATIVE EXAMPLE 6

The Example 6 is repeated except that γ-butyrolactone is not used to give heptane-insoluble polymer (71.3 g) and heptane-soluble polymer (14.8 g).

EXAMPLE 11

The Example 5 is repeated except that titanium trichloride (0.301 g) treated previously with methyl methacrylate is used to give heptane-insoluble polymer (75.3 g) and heptane-soluble polymer (6.5 g).

COMPARATIVE EXAMPLE 7

The Example 11 is repeated except that γ-butyrolactone is not used to give heptane-insoluble polymer (74.2 g) and heptane-soluble polymer (7.9 g).

The results of the above Examples 5–11 and Comparative Examples 3–7 are summarized in the following Table 2.

From these results, it is made clear that by addition of lactones the by-production of the heptane-soluble polymer is decreased and the yield of the heptane-insoluble polymer (i.e. the isotactic polymer) is increased.

TABLE 2

| Conditions and results | Example 5 | Example 6 | Example 7 | Comp. Ex. 3 | Example 8 | Comp. Ex. 4 |
|---|---|---|---|---|---|---|
| Polymerization conditions: | | | | | | |
| Titanium trichloride (AA grade, g) | 0.299 | 0.299 | 0.300 | 0.300 | 0.301 | 0.301 |
| Molar ratio of diethylaluminum chloride:titanium trichloride (AA grade) | 5.3 | 5.3 | 5.3 | 5.3 | 5.3 | 5.3 |
| Molar ratio of lactone: titanium trichloride (AA grade) | 0.20 | 0.063 | 0.18 | — | 0.093 | — |
| Temperature (°C.) | 75 | 75 | 75 | 75 | 75 | 75 |
| Pressure (kg/cm²) | 5 | 5 | 5 | 5 | 3–5 | 3–5 |
| Hydrogen partial pressure (kg/cm²) | 0.3 | 0.3 | 0.3 | 0.3 | 0.3 | 0.3 |
| Heptane-insoluble copolymer: | | | | | | |
| Yield (g) | 76.2 | 74.1 | 73.5 | 73.8 | 71.8 | 70.1 |
| Bulk density (g/cm³) | 0.339 | 0.302 | 0.300 | 0.278 | 0.342 | 0.326 |
| Intrinsic viscosity [η] (tetralin, 135° C.) | 0.85 | 0.69 | 0.74 | 0.63 | 0.63 | 0.68 |
| Insoluble copolymer production rate (% by weight) | 93.2 | 90.6 | 90.4 | 89.1 | 89.1 | 87.0 |

| Conditions and results | Example 9 | Comp. Ex. 5 | Example 10 | Comp. Ex. 6 | Example 11 | Comp. Ex. 7 |
|---|---|---|---|---|---|---|
| Polymerization conditions: | | | | | | |
| Titanium trichloride | | | | | | |

TABLE 2-continued

| | | | | | | |
|---|---|---|---|---|---|---|
| (AA grade, g) | 0.307 | 0.306 | 0.300 | 0.301 | 0.301 | 0.300 |
| Molar ratio of diethylaluminum chloride:titanium trichloride (AA grade) | 5.2 | 5.2 | 5.3 | 5.3 | 5.3 | 5.3 |
| Molar ratio of lactone: titanium trichloride (AA grade) | 0.48 | — | 0.18 | — | 0.20 | — |
| Temperature (°C.) | 60 | 60 | 75 | 75 | 75 | 75 |
| Pressure (kg/cm$^2$) | 6–8 | 6–8 | 5 | 5 | 5 | 5 |
| Hydrogen partial pressure (kg/cm$^2$) | 0.3 | 0.3 | 0.3 | 0.3 | 0.3 | 0.3 |
| Heptane-insoluble copolymer: | | | | | | |
| Yield (g) | 71.5 | 73.0 | 72.2 | 71.3 | 75.3 | 74.2 |
| Bulk density (g/cm$^3$) | 0.349 | 0.332 | 0.256 | 0.245 | 0.309 | 0.289 |
| Intrinsic viscosity [η] (tetralin, 135° C.) | 2.78 | 2.64 | 0.72 | 0.70 | 0.73 | 0.71 |
| Insoluble copolymer production rate (% by weight) | 80.0 | 78.5 | 84.2 | 82.8 | 92.1 | 90.4 |

What is claimed is:

1. In a process for producing a highly crystalline α-olefinic polymer by slurry polymerization, which comprises polymerizing propylene or a mixture of propylene and ethylene or butene-1 at a temperature of 50° to 90° C. and a pressure ranging from atmospheric pressure to 110 kg/cm$^2$ in the presence of a catalyst system having two components consisting essentially of (1) titanium trichloride, and titanium trichloride being obtained by reducing titanium tetrachloride with aluminum and pulverizing the resulting titanium trichloride, and (2) diethylaluminum chloride, the improvement comprising adding to said catalyst system a lactone selected from the group consisting of γ-butyrolactone, γ-caprolactone, ε-caprolactone and β-propiolactone, wherein the titanium trichloride, the diethylaluminum chloride and the lactone are used in the molar ratio of 1:2-10:0.01-1, respectively, whereby the amount of heptane-insoluble polymer is increased without lowering the polymerization rate and bulk density thereof.

2. In a process for producing highly crystalline polypropylene by slurry polymerization, which comprises polymerizing propylene at a temperature of 50° to 90° C. and a pressure ranging from atmospheric pressure to 100 kg/cm$^2$ in the presence of a catalyst system having two components consisting essentially of (1) titanium trichloride and (2) diethylaluminum chloride, the improvement comprising adding to said catalyst system a lactone selected from the group consisting of γ-butyrolactone, γ-caprolactone, ε-caprolactone and β-propiolactone, wherein the titanium trichloride, the diethylaluminum chloride and the lactone are used in the molar ratio of 1:2-10:0.01-1, respectively, whereby the amount of heptane-insoluble polymer is increased without lowering the polymerization rate and bulk density thereof.

3. The process according to claim 1 or claim 2, wherein said lactone is γ-butyrolactone or ε-caprolactone.

* * * * *